(12) United States Patent
Park (10) Patent No.: US 10,409,474 B2
(45) Date of Patent: Sep. 10, 2019

(54) DEVICE AND METHOD FOR CONTROLLING DISPLAYING OF USER PLAN FOR INPUTTING SCHEDULE IN CALENDAR

(71) Applicant: TimeBlocks, inc., Gyeonggi-Do (KR)

(72) Inventor: Won Il Park, Seoul (KR)

(73) Assignee: TimeBlocks, inc., Gyeonggi-do (KR)

( * ) Notice: Subject to any disclaimer, the term of this patent is extended or adjusted under 35 U.S.C. 154(b) by 539 days.

(21) Appl. No.: 15/115,259

(22) PCT Filed: Jan. 7, 2014

(86) PCT No.: PCT/KR2014/000127
§ 371 (c)(1),
(2) Date: Jul. 28, 2016

(87) PCT Pub. No.: WO2015/072622
PCT Pub. Date: May 21, 2015

(65) Prior Publication Data
US 2017/0003850 A1    Jan. 5, 2017

(30) Foreign Application Priority Data
Nov. 15, 2013  (KR) .................. 10-2013-0138793

(51) Int. Cl.
G06F 3/048      (2013.01)
G06F 3/0486     (2013.01)
(Continued)

(52) U.S. Cl.
CPC .......... G06F 3/0486 (2013.01); G06F 3/0481 (2013.01); G06F 3/14 (2013.01);
(Continued)

(58) Field of Classification Search
CPC .. G06F 3/0482; G06F 3/04817; G06F 3/0486; G06F 3/04845
See application file for complete search history.

(56) References Cited

U.S. PATENT DOCUMENTS

| | | | |
|---|---|---|---|
| 2007/0245300 A1* | 10/2007 | Chan | G06Q 10/06 717/105 |
| 2008/0250334 A1* | 10/2008 | Price | G06Q 10/109 715/753 |
| 2016/0239809 A1* | 8/2016 | Vetrov | G06F 3/03543 |

FOREIGN PATENT DOCUMENTS

| | | |
|---|---|---|
| KR | 10-2010-0013066 A | 2/2010 |
| KR | 10-2010-0063545 A | 6/2010 |

(Continued)

OTHER PUBLICATIONS

International Search Report PCT/KR2014-000127.

*Primary Examiner* — Phuong H Nguyen
(74) *Attorney, Agent, or Firm* — The PL Law Group, PLLC (57) ABSTRACT

A device for controlling displaying of a user plan for inputting schedules in a calendar includes a display unit displaying a plan window for inputting one or more pieces of schedule information in a calendar, and a control unit controlling the display unit to display a predetermined window including schedule information, which a user intends to input in the plan window, in a predetermined area of the display unit, and controlling the display unit so that when the schedule information included in the predetermined window is selected and moved on the calendar in response to input from the user, the selected and moved schedule information is inputted as a time block at a date where the schedule information has moved on the calendar.

17 Claims, 12 Drawing Sheets

(51) Int. Cl.
*G06F 9/451* (2018.01)
*G06F 3/14* (2006.01)
*G09G 5/14* (2006.01)
*G06F 9/44* (2018.01)
*G06F 3/0481* (2013.01)
*G06Q 10/10* (2012.01)
*G06F 3/0482* (2013.01)

(52) U.S. Cl.
CPC ................ *G06F 9/44* (2013.01); *G06F 9/451* (2018.02); *G06Q 10/109* (2013.01); *G09G 5/14* (2013.01); *G06F 3/0482* (2013.01); *G06F 2203/04803* (2013.01)

(56) References Cited

FOREIGN PATENT DOCUMENTS

| | | |
|---|---|---|
| KR | 10-2010-0117417 A | 11/2010 |
| KR | 10-2011-0096774 A | 8/2011 |
| KR | 10-2012-0092037 A | 8/2012 |
| KR | 10-2013-0024048 A | 3/2013 |

\* cited by examiner

| | June, 2014 | | | | | |
|---|---|---|---|---|---|---|
| Sun | Mon | Tue | Wed | Thu | Fri | Sat |
| 1 | 2 | 3 | 4 | 5 | 6<br>Memorial day | 7 |
| 8 | 9 | 10 | 11 | 12 | 13 | 14<br>Hyun-Soo's wedding |
| 15<br>Dad's birthday | 16 | 17 | 18 | 19<br>Meeting<br>Hotel reserved | 20 | 21 |
| 22 | 23 | 24 | 25 | 26 | 27 | 28 |
| 29 | 30 | | | | | |

FIG. 3

| | Sun | Mon | Tue | Wed | Thu | Fri | Sat |
|---|---|---|---|---|---|---|---|
| | \multicolumn{7}{c|}{June, 2014} | | | | | | |

| Sun | Mon | Tue | Wed | Thu | Fri | Sat |
|---|---|---|---|---|---|---|
| 1 | 2 | 3 | 4 | 5 | 6 Memorial day | 7 |
| 8 | 9 | 10 | 11 | 12 | 13 | 14 Hyun-Soo's wedding |
| 15 Dad's birthday | 16 | 17 | 18 | 19 | 20 | 21 |
| 22 | 23 | 24 | 25 | 26 | 27 | 28 |
| 29 | 30 | | | | | |

Thursdy, June nineteenth

Meeting

Hotel reserved

FIG. 4

| | Sun | Mon | Tue | Wed | Thu | Fri | Sat |
|---|---|---|---|---|---|---|---|
| | | | | June, 2014 | | | |
| | 1 | 2 | 3 | 4 | 5 | 6 Memorial day | 7 |
| | 8 | 9 | 10 | 11 | | | 14 Hyun-Soo's wedding |
| | 15 Dad's birthday | 16 | 17 | 18 | | | 21 |
| | 22 | 23 | 24 | 25 | | | |
| | 29 | 30 | | | | | |

Thursdy, June nineteenth
Meeting
Hotel reserved

| June, 2014 | | | | | | |
|---|---|---|---|---|---|---|
| Sun | Mon | Tue | Wed | Thu | Fri | Sat |
| 1 | 2<br><br>Meeting | 3 | 4 | 5 | 6<br><br>Memorial day | 7 |
| 8 | 9 | 10 | 11 | 12 | 13 | 14<br><br>Hyun-Soo's wedding |
| 15<br><br>Dad's birthday | 16 | 17 | 18 | 19<br><br>Hotel reserved | 20 | 21 |
| 22 | 23 | 24 | 25 | 26 | 27 | 28 |
| 29 | 30 | | | | | |

FIG. 7

| | Memo in June |
|---|---|
| Sun \| Mon \| 1 \| 2 \| 8 \| 9 \| 15 Dad's birthday \| 16 \| 22 \| 23 \| 29 \| 30 | Submit report |

| June, 2014 | | | | | | |
|---|---|---|---|---|---|---|
| Sun | Mon | Tue | Wed | Thu | Fri | Sat |
| 1 | 2 | 3 | 4 | 5 | 6 Memorial day | 7 |
| 8 | 9 | 10 | 11 | 12 | 13 | 14 Hyun-Soo's wedding |
| 15 Dad's birthday | 16 | 17 | | | 20 | 21 |
| 22 | 23 | 24 | | | 27 | 28 |
| 29 | 30 | | | | | |

Submit report

FIG. 10

| | | | June, 2014 | | | |
|---|---|---|---|---|---|---|
| Sun | Mon | Tue | Wed | Thu | Fri | Sat |
| 1 | 2 | 3 | 4 | 5 | 6<br>Memorial day | 7 |
| 8 | 9<br>Submit report | 10 | 11 | 12 | 13 | 14<br>Hyun-Soo's wedding |
| 15<br>Dad's birthday | 16 | 17 | 18 | 19<br>Meeting<br>Hotel reserved | 20 | 21 |
| 22 | 23 | 24 | 25 | 26 | 27 | 28 |
| 29 | 30 | | | | | |

DEVICE AND METHOD FOR CONTROLLING DISPLAYING OF USER PLAN FOR INPUTTING SCHEDULE IN CALENDAR

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2014/000127, filed Jan. 7, 2014, which claims priority to the benefit of Korean Patent Application No. 10-2013-0138793 filed in the Korean Intellectual Property Office on Nov. 15, 2013, the entire contents of which are incorporated herein by reference.

TECHNICAL FIELD

The present invention relates to device and method for controlling displaying of a user plan for inputting schedules on a calendar. More particularly, it relates to device and method for controlling displaying of a user plan for inputting schedules in a calendar, the device and method allowing for easy, quick, and intuitive input and editing of schedules without deteriorating readability when checking whole schedules or individual schedules on a calendar by efficiently using small spaces of the displays of mobile terminals such as a smart phone, by controlling a display to display a predetermined window including schedule information, which a user intends to input on a plan window, in a predetermined area of the display, and by controlling the display so that when the schedule information included in the predetermined window is selected and moved on the calendar in response to input from the user, the selected and moved schedule information is inputted in as a time block at the date where the schedule information has moved on the calendar.

BACKGROUND ART

People can complete many schedules by writing down plans on a diary or a planner, etc.

Recently, calendar programs for a computer or calendar applications for a mobile device have been developed with the development of the computer-related technology and the mobile technology. Those calendar programs for a computer can be easily used at home or at an office and those calendar applications for a mobile device can provide searching functions in addition to solving the problem of the physical size of a diary or a planner of the related art, so they are used by many people.

On the other hand, users recently spend a lot of time in the mobile environment with popularization of smartphones and the services that are provided in this situation have been optimized to the mobile environment. Various companies and administrative services that provide mobile applications have made efforts to intuitionally provide only necessary functions due to the limitations of the mobile environment.

Attempts have been made to enable the easy input and editing of schedules in calendar applications operated on mobile platforms. However, most applications provide complicated images for inputting and editing schedules. Some services provide a function of directly selecting, and dragging and dropping time blocks showing schedules on a plan window, but it is difficult to directly touch very small time blocks in a calendar on the small screens of smartphones with a finger. Obviously, it is possible to enlarge and select small time blocks by enlarging and reducing the plan windows, but it is not a method that maximizes convenience for users. Further, a technology of inputting schedules using voice has been recently proposed, but the accuracy is low and it is difficult to give complicated orders such as changing time, so there are still technical limits.

SUMMARY

An object of the present invention is to provide device and method for controlling displaying of a user plan for inputting schedules in a calendar, the device and method allowing for easy, quick, and intuitive input and editing of schedules without deteriorating readability when checking whole schedules or individual schedules on a calendar by using small spaces of the displays of mobile terminals such as a smart phone, by controlling a display to display a predetermined window including schedule information, which a user intends to input on a plan window, in a predetermined area of the display, and by controlling the display so that when the schedule information included in the predetermined window is selected and moved on the calendar in response to input from the user, the selected and moved schedule information is inputted in as a time block at the date where the schedule information has moved on the calendar.

A device for controlling displaying of a user plan for inputting schedules in a calendar according to an embodiment of the present invention includes: a display unit displaying a plan window for inputting one or more pieces of schedule information in a calendar; and a control unit controlling the display unit to display a predetermined window including schedule information, which a user intends to input in the plan window, in a predetermined area of the display unit, and controlling the display unit so that when the schedule information included in the predetermined window is selected and moved on the calendar in response to input from the user, the selected and moved schedule information is inputted as a time block at a date where the schedule information has moved on the calendar.

The selection and movement of the schedule information included in the predetermined window on the calendar may be performed by drag-and-drop.

The predetermined window may be a window displaying pre-input memos or a window displaying schedule information inputted for a corresponding date when the date is selected on the calendar.

The control unit may include a first layer controller creating a first layer for displaying the calendar on the display unit, and controlling the first layer.

The control unit may include a second layer controller creating a second layer for displaying one or more time blocks corresponding to one or more pieces of schedule information on the calendar, and controlling the second layer.

The control unit may include a third layer controller creating a third layer for continuously recognizing coordinates values of input from the user, and controlling the third layer.

The control unit may include a fourth layer controller creating a fourth layer for displaying the predetermined window, and controlling the fourth layer.

When input from the user is continued for a predetermined time or more with specific schedule information selected in the predetermined window, the fourth layer controller may control the display to remove the predetermined window on the fourth layer and transmit the schedule information to the third layer controller.

When receiving the schedule information from the fourth layer controller, the third layer controller may create coordinate information by tracing coordinate values of input from the user on the third layer and transmit the schedule information and the coordinate information to the second layer controller.

The second layer controller may control the display unit to display a time block corresponding to the schedule information in the calendar of the first layer on the second layer in accordance with the coordinate information.

When schedule information inputted as a time block in the calendar is selected and moved to the predetermined window in response to input from a user, the control unit may control the display unit to display the selected and moved schedule information in the predetermined window.

A method of controlling displaying of a user plan for inputting schedules in a calendar according to an embodiment of the present invention includes: displaying, by a display unit, a plan window for inputting one or more pieces of schedule information in a calendar; and controlling the display unit to display a predetermined window including schedule information, which a user intends to input in the plan window, in a predetermined area of the display unit, by means of a control unit, and controlling the display unit so that when the schedule information included in the predetermined window is selected and moved on the calendar in response to input from the user, the selected and moved schedule information is inputted as a time block at a date where the schedule information has moved on the calendar, by means of the control unit The selection and movement of the schedule information included in the predetermined window on the calendar may be performed by drag-and-drop.

The predetermined window may be a window displaying pre-input memos or a window displaying schedule information inputted for a corresponding date when the date is selected in the calendar.

The plan window may include: a first layer displaying the calendar; a second layer displaying one or more time blocks corresponding to one or more pieces of schedule information in the calendar; a third layer continuously recognizing coordinate values of input from the user; and a fourth layer displaying the predetermined window.

The controlling of the display unit may include controlling the display unit to remove the predetermined window on the fourth layer by means of a fourth layer controller of the control unit, and transmitting schedule information to a third layer controller of the control unit by means of the fourth layer controller, when input from the user is continued for a predetermined time or more with specific schedule information selected in the predetermined window.

The controlling of the display unit may create coordinate information by tracing coordinate values of input from the user on the third layer and transmit the schedule information and the coordinate information to a second layer controller by means of the third layer controller, when receiving the schedule information from the fourth layer controller.

The controlling of the display unit may control the display unit to display a time block corresponding to the schedule information in the calendar of the first layer on the second layer in accordance with the coordinate information by means of the second layer controller.

The method may further include, when schedule information inputted as a time block in the calendar is selected and moved to the predetermined window in response to input from a user, controlling the display unit to display the selected and moved schedule information in the predetermined window, by means of the control unit.

According to the present invention, it is possible to easily, quickly, and intuitionally input and edit schedules without deteriorating readability when checking whole schedules and individual schedules on a calendar by using small spaces of the displays of mobile terminals such as a smart phone, by controlling a display to display a predetermined window including schedule information, which a user intends to input on a plan window, in a predetermined area of the display, and by controlling the display so that when the schedule information included in the predetermined window is selected and moved on the calendar in response to input from the user, the selected and moved schedule information is inputted as a time block at the date where the schedule information has moved on the calendar.

DETAILED DESCRIPTION

Embodiments of the present invention will be described hereafter in detail with reference to the accompanying drawings. Further, repetition, and well-known functions and configurations that may unnecessarily make the spirit of the present invention unclear are not described in detail. The embodiments are provided to more completely explain the present invention to those skilled in the art. Therefore, the shapes and sizes of the components in the drawings may be exaggerated for more clear explanation.

Through the present specification, unless explicitly described otherwise, "comprising" any components will be understood to imply the inclusion of other components rather than the exclusion of any other components.

Further, the term "unit" stated herein means a unit that performs one or more functions or operations and may be achieved by hardware, software, or a combination of hardware and software.

Figure 1:
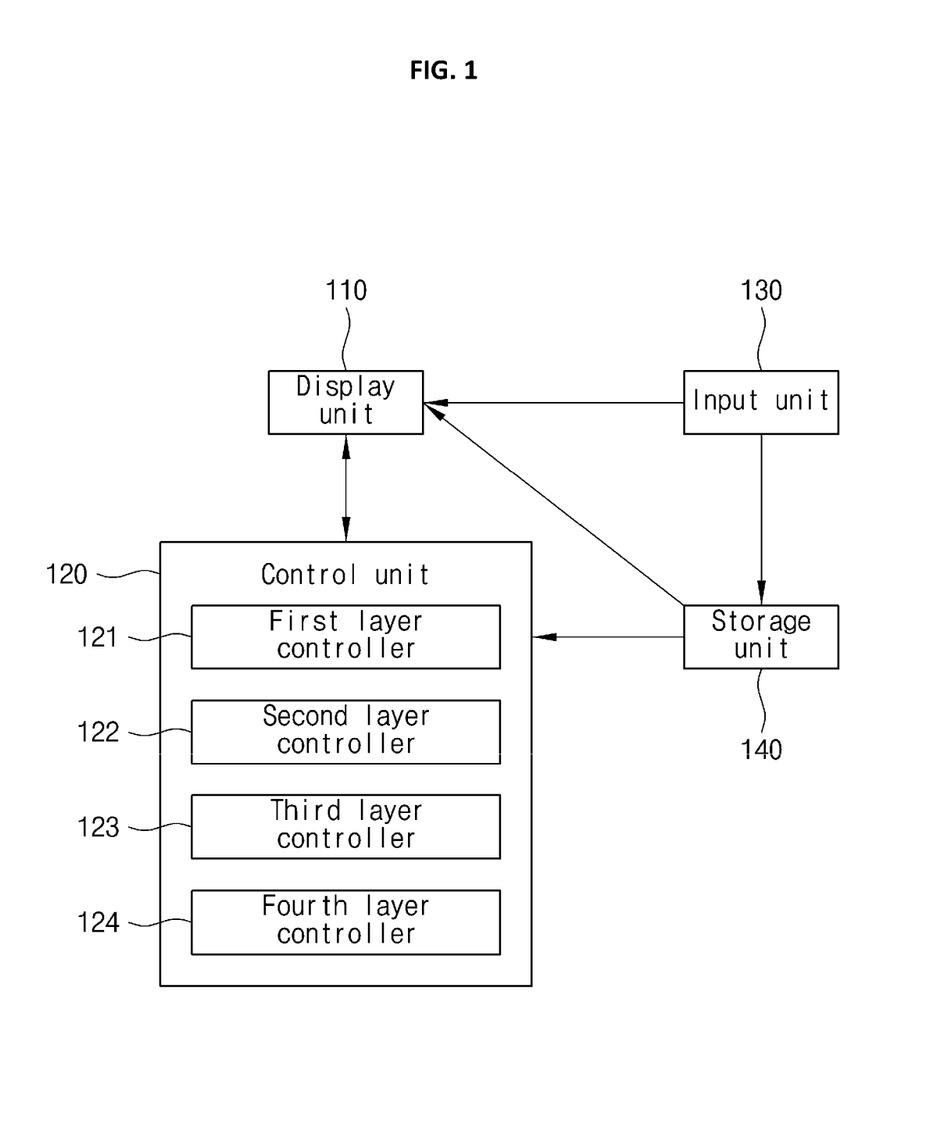
FIG. 1 is a diagram schematically showing a device for controlling displaying of a user plan for inputting schedules in a calendar according to an embodiment of the present invention.

FIG. 1 is a diagram schematically showing a device for controlling displaying of a user plan for inputting schedules in a calendar according to an embodiment of the present invention.

Referring to FIG. 1, a device for controlling displaying of a user plan for inputting schedules in a calendar according to an embodiment of the present invention may include a display unit 110, a control unit 120, an input unit 130, and a storage unit 140. The device for controlling displaying of a user plan is just an embodiment, all the blocks shown in FIG. 1 are necessary blocks, and some blocks may be added, changed, or removed in other embodiments.

In an embodiment, the device for controlling displaying of a user plan for inputting schedules in a calendar may be one or more of a personal computer, a smartphone, a PDA (Personal Digital Assistant), and a tablet computer. Alternatively, in another embodiment, the device for controlling displaying of a user plan for inputting schedules in a calendar may be included in one or more of a personal computer, a smartphone, a PDA, and a tablet computer. Alternatively, in another embodiment, the device for controlling displaying of a user plan for inputting schedules in a calendar may be implemented as a web browser, a computer application program, or a mobile application installed in one or more of a personal computer, a smartphone, a PDA, and a tablet computer.

The display unit 110 displays a plan window for inputting one or more pieces of schedule information in a calendar. The plan window is an image for showing plans by predetermined time, and for example, it may be a monthly plan window showing calendars by month. The time unit in time areas in the monthly plan window may be a day. In an embodiment, the display unit 110 may be a common display such as an LED (Light Emitting Diode) display and an LCD (Liquid Crystal Display). When the device for controlling displaying of a user plan for inputting schedules in a calendar is a mobile terminal such as a smartphone, the display unit 110 may be a display including an input device such as a touch panel.

The control unit 120 controls the display unit 110 to display a predetermined window including schedule information, which a user intends to input on the plan window, in a predetermined area of the display unit 110, and controls the display unit 110 so that when the schedule information included in the predetermined window is selected and moved on the calendar in response to input from the user, the selected and moved schedule information is inputted as a time block at the date where the schedule information has moved on the calendar.

Alternatively, in contrast, the control unit may control the display unit so that when the schedule information inputted as a time block on the calendar, in response to input from a user, is selected and moved to the predetermined window, the selected and moved schedule information is displayed in the predetermined window.

In an embodiment, the predetermined window may be a window where pre-input memos are displayed, or a window where pre-input schedule information at a corresponding date is displayed when a specific date in the calendar is selected. Examples of the predetermined window are shown in FIGS. 3 to 7 and will be described below.

Further, in an embodiment, the way of selecting and moving schedule information included in the predetermined window on the calendar may be performed by drag-and-drop. For example, when schedule information in the predetermined window is selected, dragged, and moved and dropped to a specific date in response to input from a user, the selected and moved schedule information can be inputted as a time block at the corresponding date in the calendar.

Examples of detailed operation of the control unit 120 will be described be low in detail with reference to the drawings.

The input unit 130 provides an interface for inputting schedule information into the calendar in response to input from a user. In an embodiment, the input unit 130 allows a user to input and set a schedule in a plan window displayed on the display unit 110 through a specific input device (not shown) or an input device such as a touch panel of the display unit 110.

The store unit 140 keeps schedule information inputted through the input unit. The storage unit 140 may be a storage device such as a flash memory, a hard disk, a built-in memory of a smartphone, and an SD (Secure Digital) card.

The operation of the control unit 120 of the for controlling displaying of a user plan for inputting schedules on a calendar according to an embodiment of the present invention is described hereafter in detail with reference to FIGS. 2 to 10.

FIGS. 2 to 6 are diagrams illustrating an example of the operation of a control unit in a device for controlling displaying of a user plan for inputting schedules in the calendar according to an embodiment of the present invention.

Figure 2:
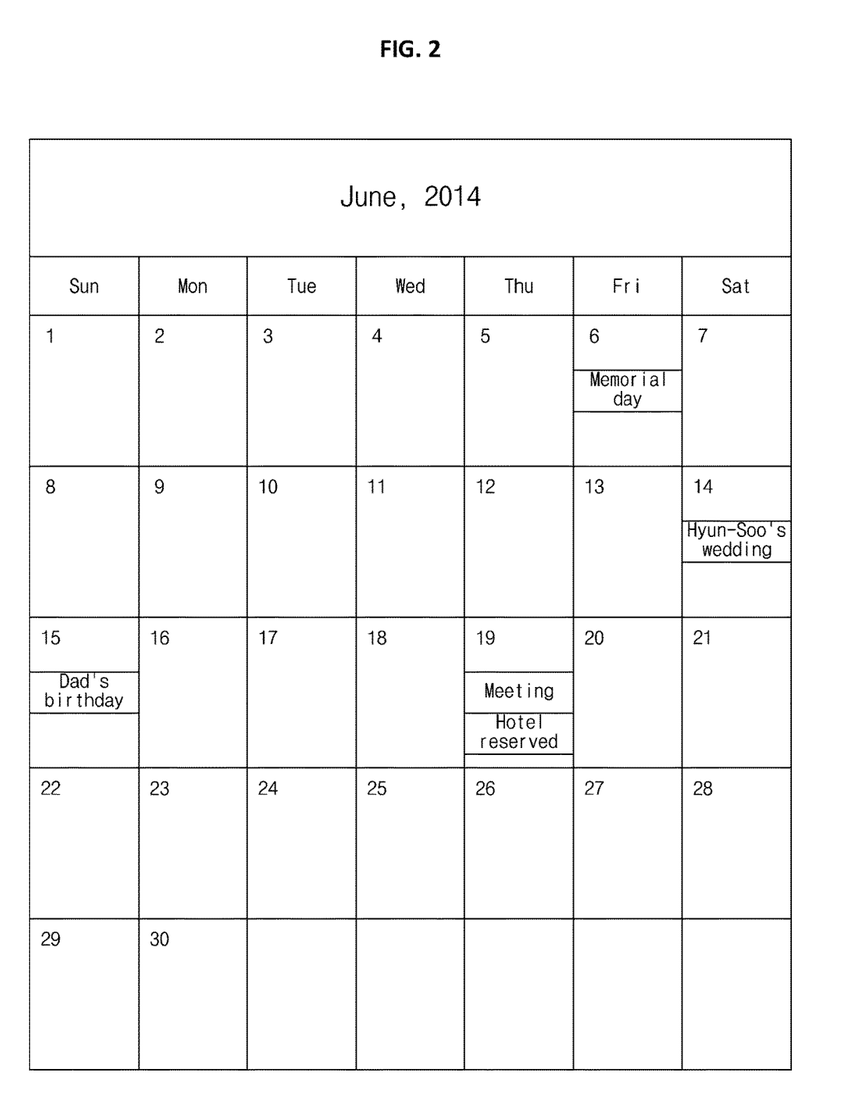
FIGS. 2 to 6 are diagrams illustrating an example of the operation of a control unit in a device for controlling displaying of a user plan for inputting schedules in the calendar according to an embodiment of the present invention.

Referring to FIG. 2, a portion of a plan window that can be displayed on the display unit 110 is shown. As shown in FIG. 2, in the plan window, a calendar is displayed and schedules can be inputted for each date.

Figure 3:
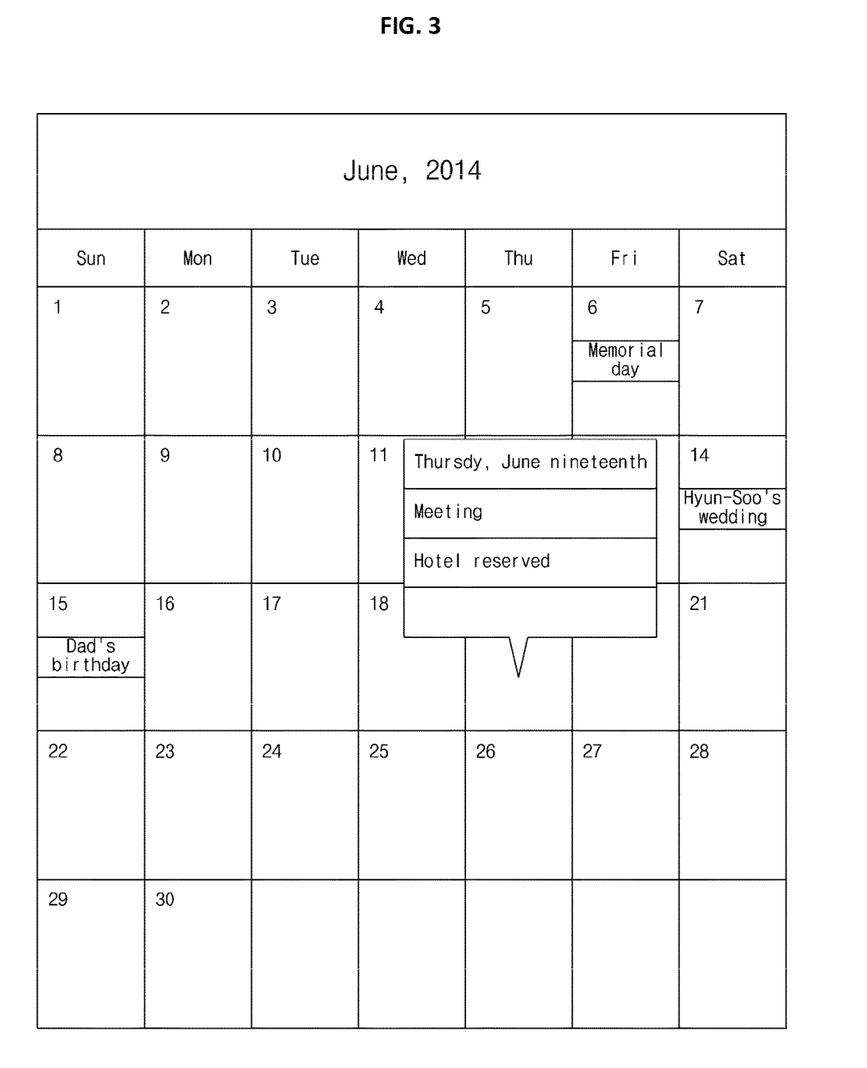

Referring to FIG. 3, a predetermined window including schedule information, which a user intends to input on the plan window, is shown in a predetermined area of the display unit 110. A window in which when a specific date in the calendar is selected, the schedule information that has been inputted for the date is selected is shown in FIG. 3. In detail, in FIG. 3, June nineteenth is selected and schedules inputted for June nineteenth are displayed in a popup window in the plan window of FIG. 2. In the popup window, the schedules are shown by letters larger than other letters in the plan window, so a user can easily read the schedules, that is, readability is improved.

Figure 4:
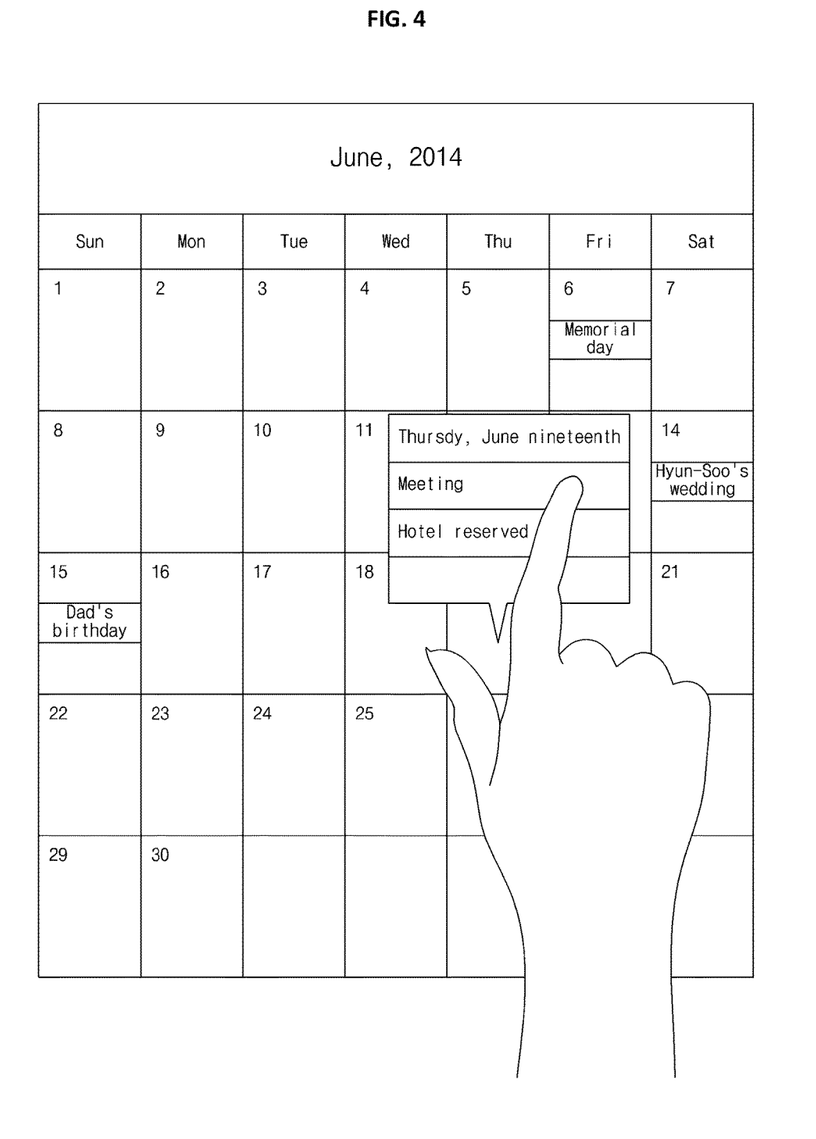
Figure 5:
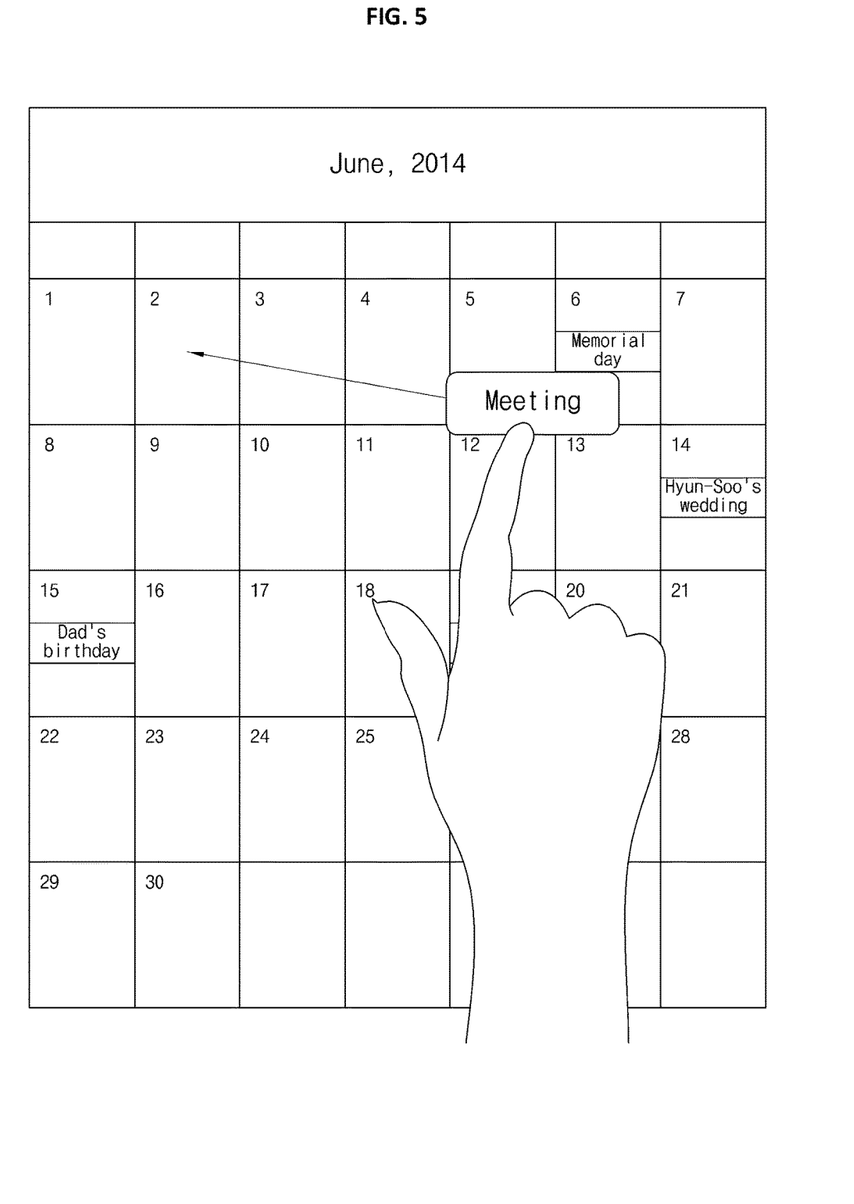

Referring to FIG. 4, a meeting has been selected from the schedules on June nineteenth. When specific schedule information is selected and maintained for a predetermined time, the schedule information is changed into a movable block and the predetermined window is removed, as in FIG. 5. The movable block can be moved to another date in response to input from the user.

Figure 6:
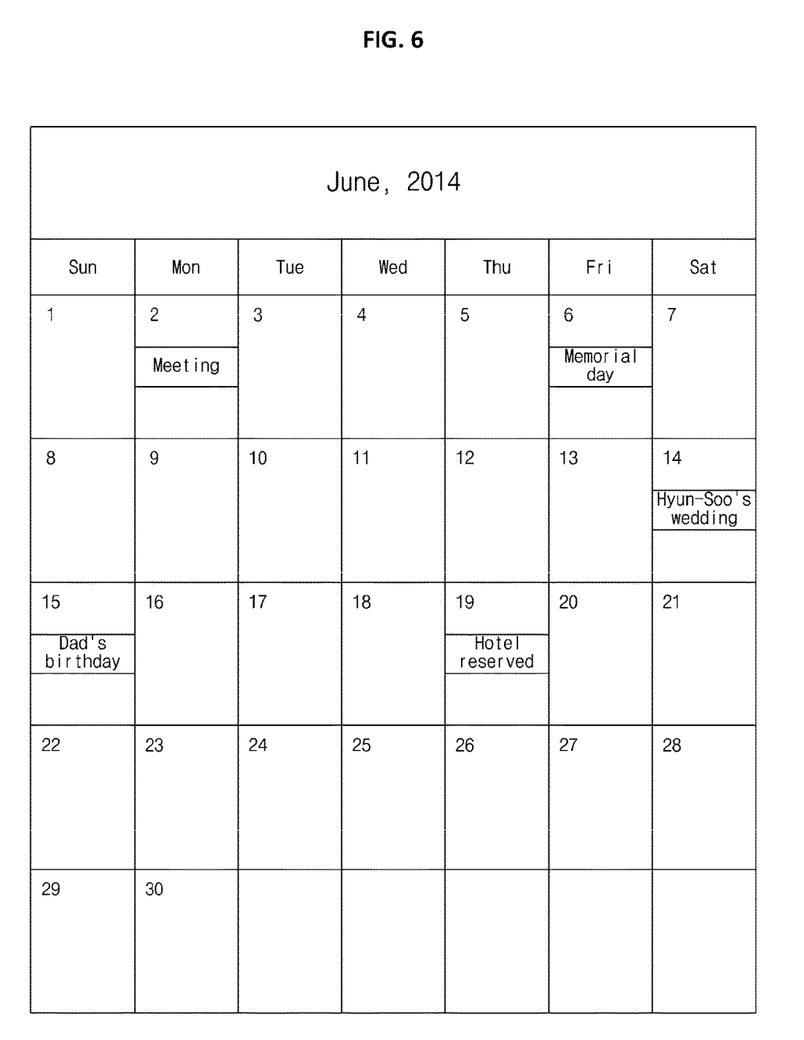

Referring to FIG. 6, a 'meeting' of the schedule information inputted for June nineteenth in FIG. 2 has been moved to June second. As described with reference to FIGS. 2 to 6, the device for controlling displaying of a user plan for inputting schedules in a calendar according to an embodiment of the present invention makes it possible to easily, quickly, and intuitionally change schedule information inputted for specific date in a plan window to another date without deteriorating readability.

FIGS. 7 to 10 are diagrams illustrating another example of the operation of the control unit in the device for controlling displaying of a user plan according to an embodiment of the present invention.

Figure 7:
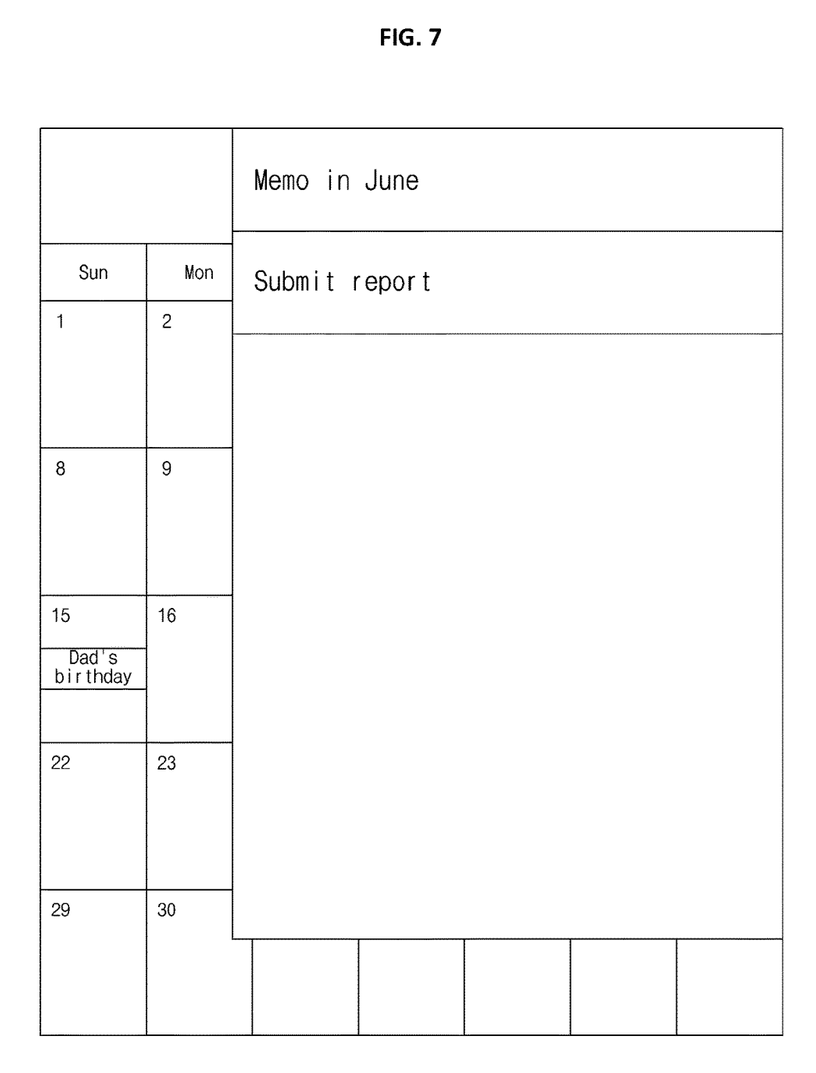
FIGS. 7 to 10 are diagrams illustrating another example of the operation of the control unit in the device for controlling displaying of a user plan according to an embodiment of the present invention.

Referring to FIG. 7, a predetermined window including schedule information, which a user intends to input on a plan window, is displayed in a predetermined area of the display unit 110. A window showing a pre-input memo is shown in FIG. 7. In detail, a memo window is displayed as an individual window in a predetermined area on the plan window of FIG. 2. In the memo window, the schedules are shown by letters larger than other letters in the plan window, so a user can easily read the schedules, thereby improving readability.

Figure 8:
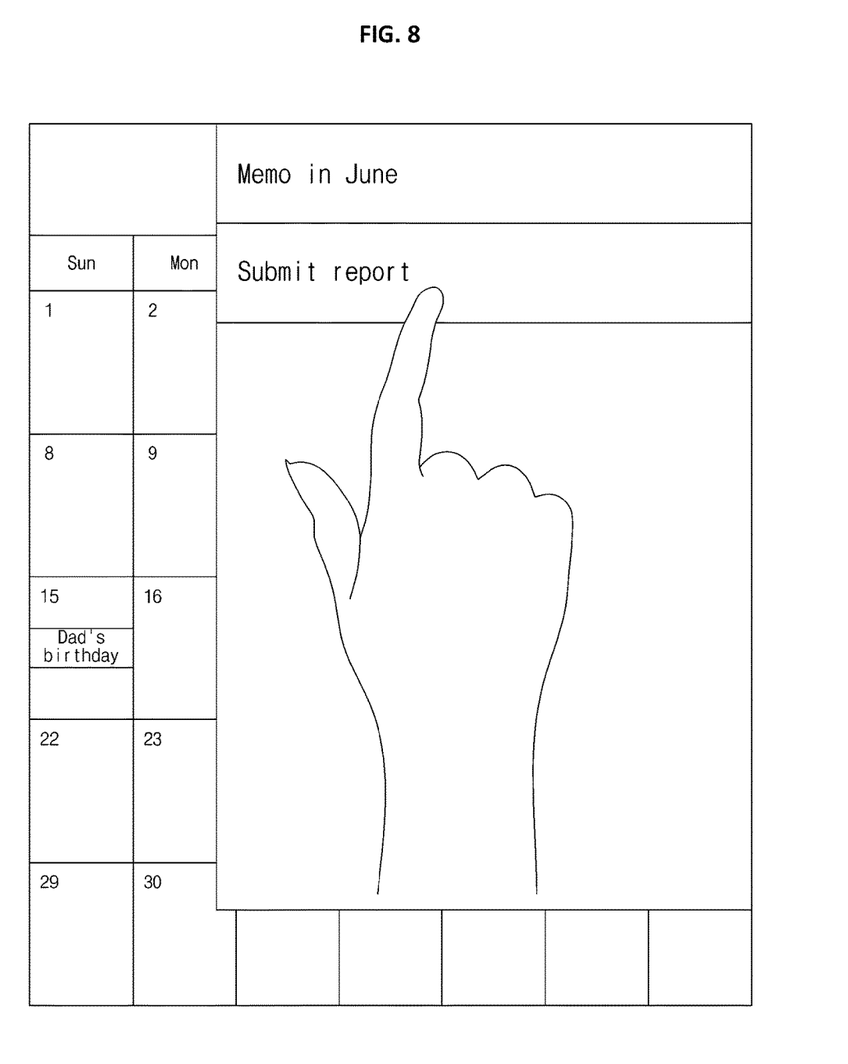
Figure 9:
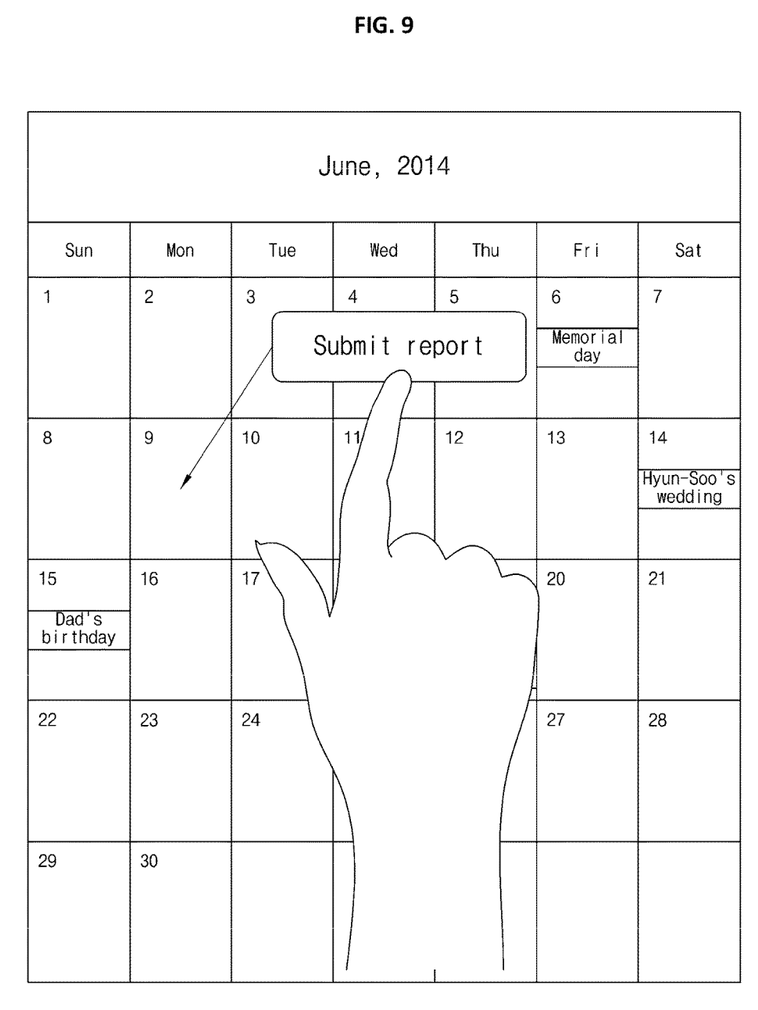

Referring to FIG. 8, 'submit report', which is a schedule in the memo window, has been selected. When specific schedule information is selected and maintained for a predetermined time, the schedule information is changed into a movable block and the memo window is removed, as in FIG. 9. The movable block can be moved to another date in response to input from the user.

Figure 10:
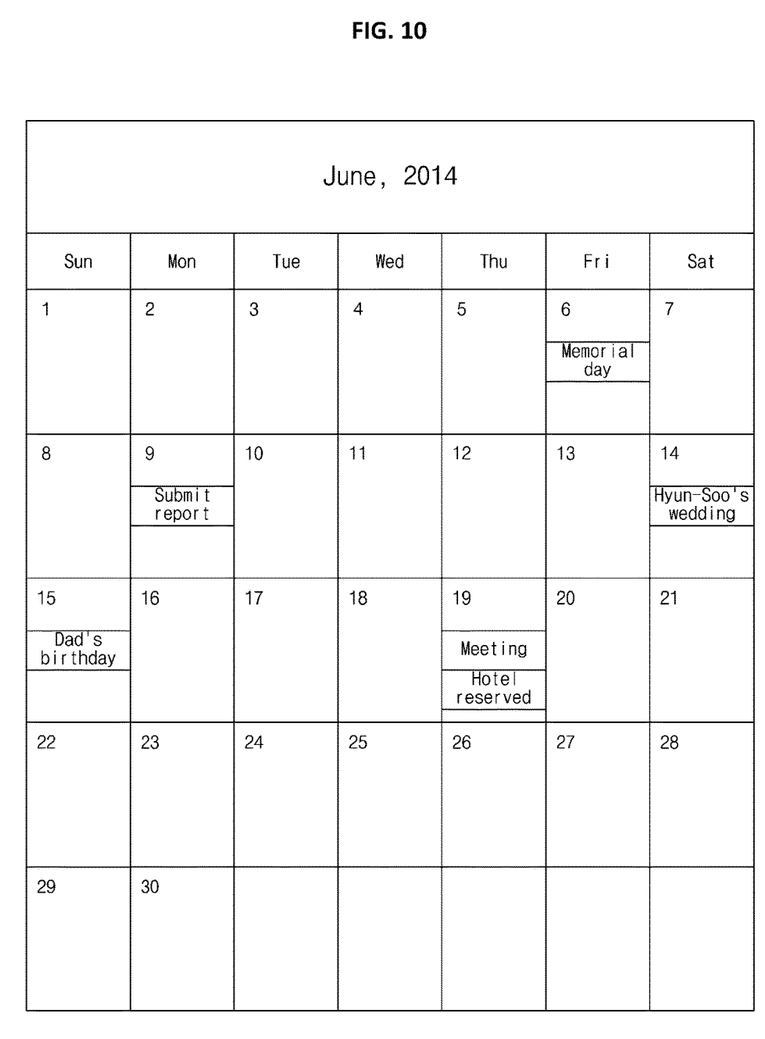

Referring to FIG. 10, the 'submit report' that is schedule information in the memo window in FIG. 7 has been moved to June nineteenth.

As described with reference to FIGS. 7 to 10, the device for controlling displaying of a user plan for inputting schedules in a calendar makes it possible to easily, quickly, and intuitionally move schedule information in a memo window to a plan window without deteriorating readability.

Figure 11:
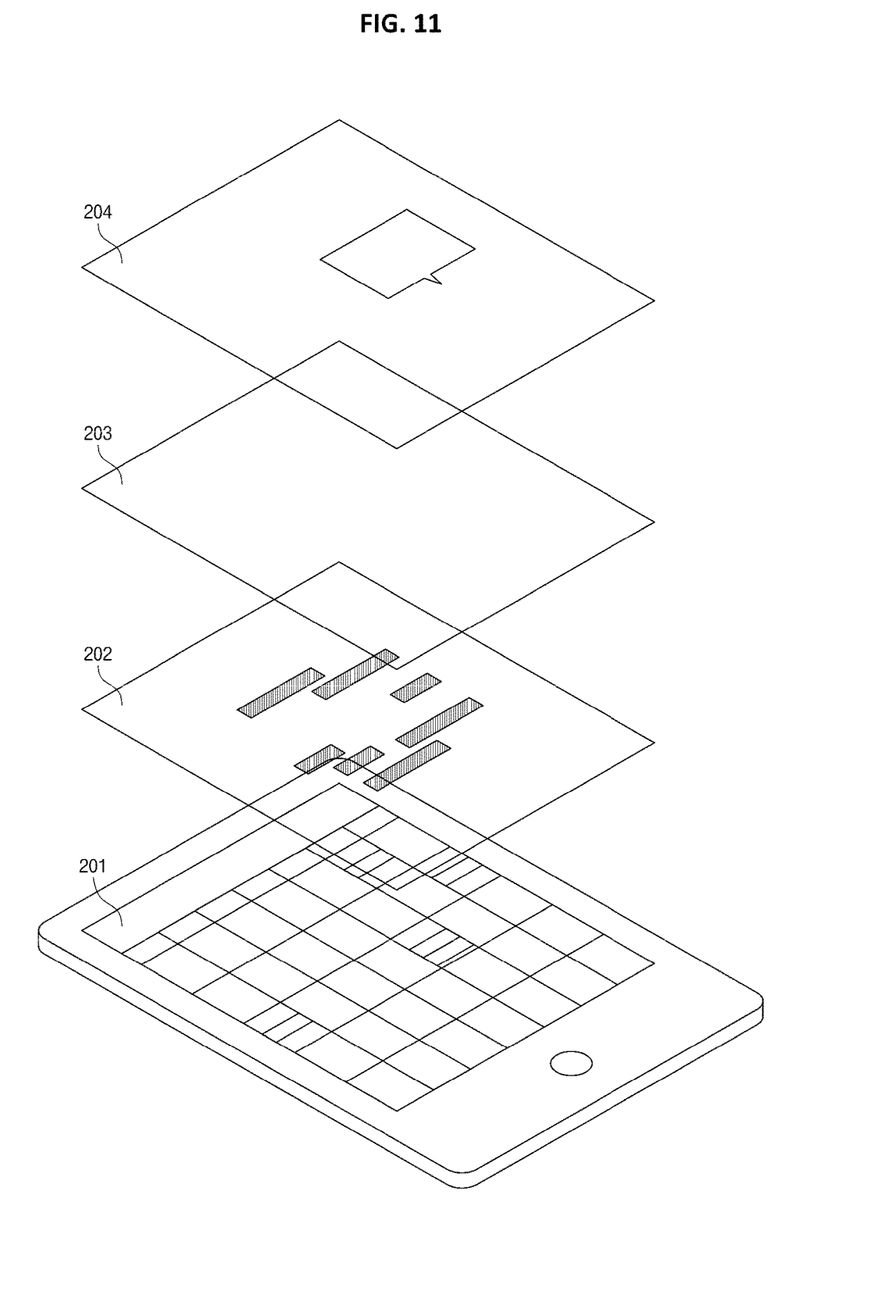
FIG. 11 is a diagram schematically showing an example of the configuration of a plan window of the device for controlling displaying of a user plan for inputting schedules in a calendar according to an embodiment of the present invention.

FIG. 11 is a diagram schematically showing an example of the configuration of a plan window of the device for controlling displaying of a user plan for inputting schedules in a calendar according to an embodiment of the present invention.

A plan window may have the configuration shown in FIG. 11 in order to provide the operation of the control unit described with reference to FIGS. 2 to 10.

In the embodiment shown in FIG. 11, the plan window may include a first layer 201 that displays the calendar, a second layer 202 that displays one or more time blocks corresponding to one or more pieces of schedule information, a third layer 203 that continuously recognizes coordinate values inputted by a user, and a fourth layer 204 that displays a predetermined window.

In order to control the plan window composed of a plurality of layers, the control unit, as shown in FIG. 1, may include a first layer controller 121, a second layer controller 122, a third layer controller 123, and a fourth layer controller 124. The configuration of the control unit 120 shown in FIG. 2 is just an embodiment, all the blocks shown in FIG. 2 are necessary blocks, and some blocks may be added, changed, or removed in other embodiments.

The first layer controller 121 creates a first layer 201 for displaying the calendar on the display unit 110 and controls the first layer and the second layer controller 122 creates a second layer 202 for display of one or more time blocks corresponding to one or more pieces of schedule information in the calendar and controls the second layer 202.

Further, the third layer controller 130 creates a third layer 203 for continuously recognizing coordinate values inputted by the user and controls the third layer 203 and the fourth layer 140 creates a fourth layer 204 for display of a predetermined window and controls the fourth layer 204.

As described above, an example of the operation of the control unit composed of the first layer controller 121, the second layer controller 122, the third layer controller 123, and the fourth layer controller 124 will be described in detail with reference to FIG. 12.

Figure 12:
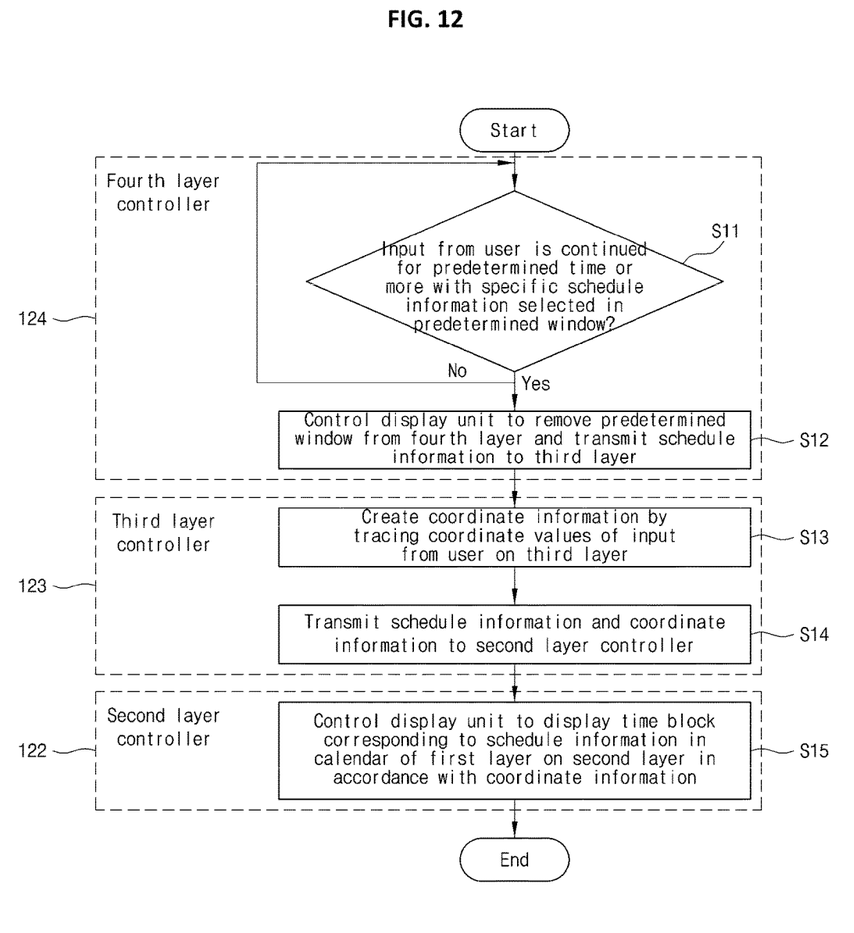
FIG. 12 is a flowchart illustrating an example of the operation of the control unit in the device for controlling displaying of a user plan for inputting schedules in a calendar according to an embodiment of the present invention.

FIG. 12 is a flowchart illustrating an example of the operation of the control unit in the device for controlling displaying of a user plan for inputting schedules in a calendar according to an embodiment of the present invention.

Referring to FIG. 12, first, the fourth layer 124 determines whether input from a user is continued for a predetermined time or more with specific schedule information selected in the predetermined window (S11), and when the input from the user is maintained for a predetermined time or more, the fourth layer controller 124 controls the display unit to remove the predetermined window and transmits the schedule information to the third layer controller 123 (S12).

Further, when receiving the schedule information from the fourth layer controller 204, the third layer controller 123 creates coordinate information by tracing the coordinate values of the input from the user on the third layer 230 and transmits the schedule information and the coordinate information to the second layer controller 122 (S13).

The second layer controller 122 receiving the schedule information and the coordinate information controls the display unit 110 to display the time block corresponding to the schedule information in the calendar of the first layer 201 on the second layer in accordance with the coordinate information.

The method of controlling displaying of a user plan for inputting schedules in a calendar according to an embodiment of the present invention can be achieved by the components of the device for controlling displaying of a user plan for inputting schedules in a calendar according to an embodiment of the present invention. Further, the method of controlling displaying of a user plan for inputting schedules in a calendar according to an embodiment of the present invention controls displaying of a user plan, similar to the device for controlling displaying of a user plan for inputting schedules in a calendar according to an embodiment of the present invention, so the detailed description of the method of controlling displaying of a user plan for inputting schedules in a calendar is not described to prevent repetition.

Although specific embodiments of the present invention were described above, the technical spirit of the present invention is not limited to the accompanying drawings and the above description and can be modified in various ways to without departing from the scope of the present invention, which is apparent to those skilled in the art. Further, those modifications should be construed as being included in claims within the scope of the present invention.

The invention claimed is:

1. A device for controlling displaying of a user plan for inputting schedules in a calendar, the device comprising a processor configured to control:

a display unit displaying a plan window for inputting one or more pieces of schedule information shown by letters in a calendar; and a control unit creating a first layer for displaying the calendar on the display unit, creating a second layer for displaying the schedule information on the calendar, creating a third layer for continuously recognizing coordinates values of input from the user, creating a fourth layer for displaying a popup window displaying schedule information on a specific date when a user selects the specific date in the plan window, wherein, when a user selects a specific schedule among the schedule information on the specific date in the popup window, and an input from the user is continued for a predetermined time or more with the selected specific schedule information, the popup window is removed, and only the selected specific schedule information is displayed and moved on the calendar in response to input from the user, the selected and moved specific schedule information is inputted as a time block at a date where the schedule information has moved on the calendar; and the control unit controls the letters of the schedule information in the popup window larger than the letters in the plan window.

2. The device of claim 1, wherein the selection and movement of the schedule information included in the popup window on the calendar is performed by drag-and-drop.

3. The device of claim 1, wherein the control unit includes a first layer controller creating the first layer for displaying the calendar on the display unit, and controlling the first layer.

4. The device of claim 3, wherein the control unit includes a second layer controller creating the second layer for displaying one or more time blocks corresponding to one or more pieces of schedule information on the calendar, and controlling the second layer.

5. The device of claim 4, wherein the control unit includes a third layer controller creating the third layer for continuously recognizing coordinates values of input from the user, and controlling the third layer.

6. The device of claim 5, wherein the control unit includes a fourth layer controller creating a fourth layer for displaying the popup window, and controlling the fourth layer.

7. The device of claim 6, wherein when the input from the user is continued for the predetermined time or more with specific schedule information selected in the popup window, the fourth layer controller controls the display unit to remove the popup window on the fourth layer and transmits the schedule information to the third layer controller.

8. The device of claim 7, wherein when receiving the schedule information from the fourth layer controller, the third layer controller creates coordinate information by tracing coordinate values of input from the user on the third layer and transmits the schedule information and the coordinate information to the second layer controller.

9. The device of claim 8, wherein the second layer controller controls the display unit to display a time block corresponding to the schedule information in the calendar of the first layer on the second layer in accordance with the coordinate information.

10. The device of claim 1, wherein when schedule information inputted as a time block in the calendar is selected and moved to the popup window in response to input from a user, the control unit controls the display unit to display the selected and moved schedule information in the popup window.

11. A method of controlling displaying of a user plan for inputting schedules in a calendar, the method comprising:
displaying, by a display unit, a plan window for inputting one or more pieces of schedule information in a calendar; and
controlling the display unit by creating a first layer for displaying the calendar on the display unit, creating a second layer for displaying the schedule information on the calendar, creating a third layer for continuously recognizing coordinates values of input from the user, and creating a fourth layer for displaying a popup window displaying schedule information on a specific date when a user selects the specific date in the plan window,
wherein, when a user selects a specific schedule among the schedule information on the specific date in the popup window, and an input from the user is continued for a predetermined time or more with the selected specific schedule information, the popup window is removed, and only the selected specific schedule information is displayed and moved on the calendar in response to input from the user, the selected and moved specific schedule information is inputted as a time block at a date where the schedule information has moved on the calendar; and
the control unit controls the letters of the schedule information in the popup window larger than the letters in the plan window.

12. The method of claim 11, wherein selection and movement of the schedule information included in the popup window on the calendar is performed by drag-and-drop.

13. The method of claim 11, wherein the plan window includes:
a first layer displaying the calendar;
a second layer displaying one or more time blocks corresponding to one or more pieces of schedule information in the calendar;
a third layer continuously recognizing coordinate values of input from the user; and
a fourth layer displaying the popup window.

14. The method of claim 13, wherein the controlling of the display unit includes controlling the display unit to remove the popup window on the fourth layer by means of a fourth layer controller of the control unit, and transmitting schedule information to a third layer controller of the control unit by means of the fourth layer controller, when input from the user is continued for a predetermined time or more with specific schedule information selected in the popup window.

15. The method of claim 14, wherein the controlling of the display unit further includes creating coordinate information by tracing coordinate values of input from the user on the third layer and transmitting the schedule information and the coordinate information to a second layer controller by means of the third layer controller, when receiving the schedule information from the fourth layer controller.

16. The method of claim 15, wherein the controlling of the display unit further includes controlling the display unit to display a time block corresponding to the schedule information in the calendar of the first layer on the second layer in accordance with the coordinate information by means of the second layer controller.

17. The method of claim 11, further comprising, when schedule information inputted as a time block in the calendar is selected and moved to the popup window in response to input from a user, controlling the display unit to display the selected and moved schedule information in the popup window, by means of the control unit.

* * * * *